United States Patent
Reddy et al.

(10) Patent No.: US 10,230,694 B2
(45) Date of Patent: Mar. 12, 2019

(54) CONTENT INSPECTION IN PRIVACY ENHANCED CLOUD CONFERENCING

(71) Applicant: Cisco Technology, Inc., San Jose, CA (US)

(72) Inventors: K. Tirumaleswar Reddy, Karnataka (IN); Prashanth Patil, San Jose, CA (US); Daniel G. Wing, Truckee, CA (US); Ram Mohan Ravindranath, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 198 days.

(21) Appl. No.: 15/211,259

(22) Filed: Jul. 15, 2016

(65) Prior Publication Data

US 2018/0019978 A1    Jan. 18, 2018

(51) Int. Cl.
| | |
|---|---|
| *H04L 29/06* | (2006.01) |
| *H04N 21/2347* | (2011.01) |
| *H04N 21/266* | (2011.01) |
| *H04N 21/643* | (2011.01) |
| *H04N 21/4405* | (2011.01) |

(Continued)

(52) U.S. Cl.
CPC ...... *H04L 63/0428* (2013.01); *H04L 63/0227* (2013.01); *H04L 63/0245* (2013.01); *H04L 63/06* (2013.01); *H04L 63/108* (2013.01); *H04L 63/166* (2013.01); *H04L 63/20* (2013.01); *H04N 7/147* (2013.01); *H04N 7/152* (2013.01); *H04N 21/2347* (2013.01); *H04N 21/26613* (2013.01); *H04N 21/4405* (2013.01); *H04N 21/64322* (2013.01); *H04L 63/029* (2013.01)

(58) Field of Classification Search
CPC ............. H04L 63/0227; H04L 63/0245; H04L 63/029; H04L 63/0428; H04L 63/20; H04L 63/108; H04N 7/147; H04N 21/2347; H04N 21/4405
See application file for complete search history.

(56) References Cited

U.S. PATENT DOCUMENTS

| | | | | |
|---|---|---|---|---|
| 7,536,715 | B2 * | 5/2009 | Markham | ................. G06F 9/00 726/11 |
| 9,210,200 | B1 | 12/2015 | Chapweske et al. | |

(Continued)

FOREIGN PATENT DOCUMENTS

EP     2706723   A2    3/2014

*Primary Examiner* — Theodore C Parsons
*Assistant Examiner* — Carlos M De Jesus Lassala
(74) *Attorney, Agent, or Firm* — Edell, Shapiro & Finnan, LLC

(57) ABSTRACT

A media distribution network device connects to an online collaborative session between a first participant network device, a second participant network device, and a security participant network device. The security participant network device is configured to decrypt packets of the online collaborative session to apply security polices to the packets. An encrypted packet is received at the media distribution network device. The encrypted packet is received from the first participant network device containing data to be distributed as part of the online collaborative session. The encrypted packet is distributed to the security participant network device prior to distributing the encrypted packet to the second participant network device.

20 Claims, 8 Drawing Sheets

(51) Int. Cl.
*H04N 7/14* (2006.01)
*H04N 7/15* (2006.01)

(56) References Cited

U.S. PATENT DOCUMENTS

| | | | |
|---|---|---|---|
| 2003/0154410 A1* | 8/2003 | Drell ........................ | H04L 9/00 713/201 |
| 2007/0033283 A1* | 2/2007 | Brown .................... | H04L 51/12 709/226 |
| 2008/0005245 A1* | 1/2008 | Deboy et al. ......... | H04L 63/029 709/204 |
| 2008/0095079 A1* | 4/2008 | Barkley et al. ......... | H04L 12/16 370/260 |
| 2014/0075535 A1 | 3/2014 | Soffer et al. | |

* cited by examiner

CONTENT INSPECTION IN PRIVACY ENHANCED CLOUD CONFERENCING

TECHNICAL FIELD

The present disclosure relates to online collaborative sessions, such as video conferences and real-time instant messaging sessions.

BACKGROUND

Cloud conferencing systems that are based on switched conferencing have a central media distribution device that receives media from clients and distributes it to other clients, but does not need to interpret or change the media content. Endpoints in privacy-enhanced conferencing may use data channels to exchange non-media data, i.e., file transfer data, chat data, white-boarding data, and others. These data channels may be encrypted, thereby providing privacy enhanced conferencing. Use of data channels for such non-media data exchanges is becoming increasingly popular to offer a better collaboration experience.

DESCRIPTION OF EXAMPLE EMBODIMENTS

Overview

According to one example embodiment, a media distribution network device connects to an online collaborative session between a first participant network device, a second participant network device, and a security participant network device. The security participant network device is configured to decrypt packets of the online collaborative session to apply security polices to the packets. An encrypted packet is received at the media distribution network device. The encrypted packet is received from the first participant network device containing data to be distributed as part of the online collaborative session. The encrypted packet is distributed to the security participant network device prior to distributing the encrypted packet to the second participant network device.

According to another example embodiment, a security participant network device connects to an online collaborative session that includes a first participant network device, a second participant network device and a media distribution network device. The media distribution network device is configured to distribute packets of the online collaborative session to the security participant network device, the first participant network device and the second participant network device. The security participant network device is configured to apply one or more security policies to the packets. An encrypted packet sent from the first participant network device to the media distribution network device is received at the security participant network device. The encrypted packet was distributed to the security participant network device by the media distribution network prior to the media distribution network device distributing the first encrypted packet to the second participant network device. Decrypted content is determined by decrypting the encrypted packet. The one or more security policies are applied to the decrypted content. A response is sent to the media distribution network device based on the one or more security policies applied to the decrypted content.

Example Embodiments

Figure 1:
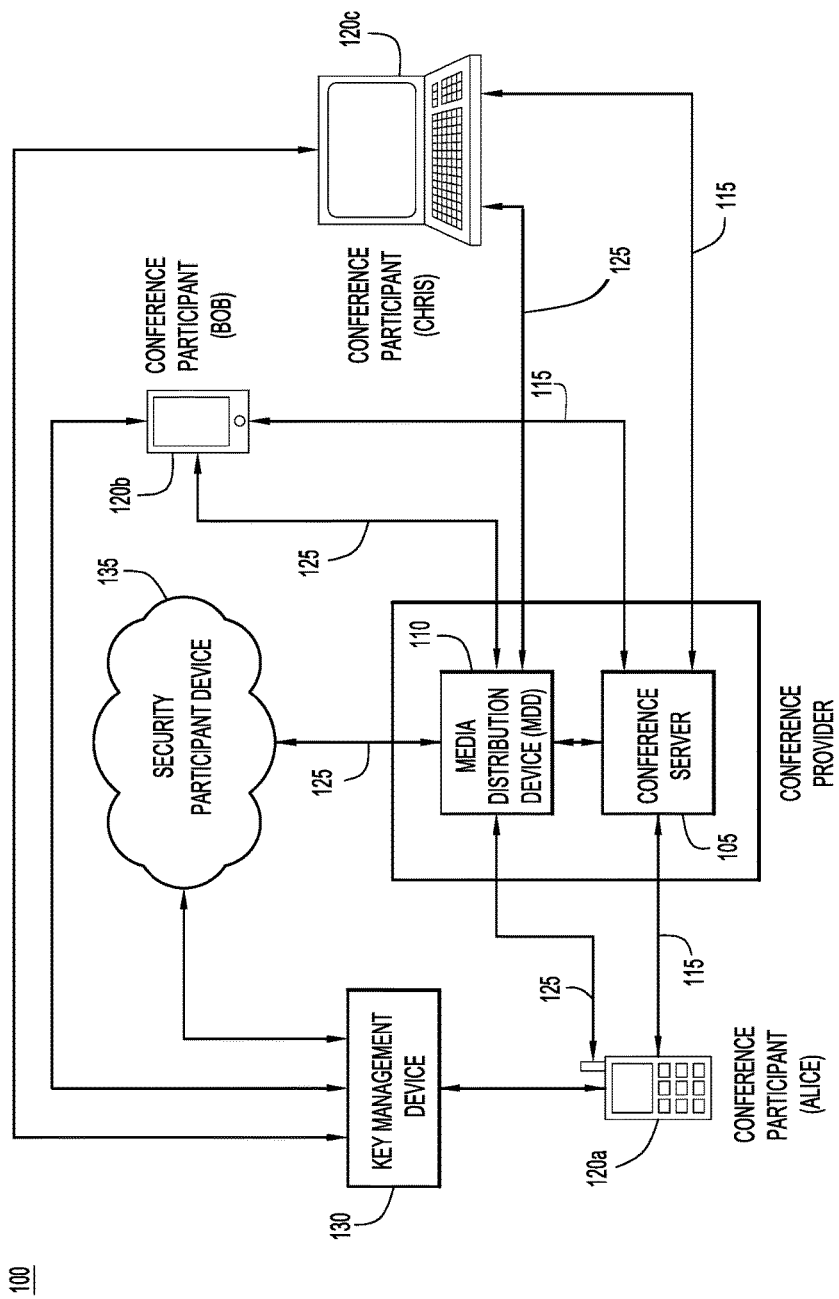
FIG. 1 is a block diagram illustrating a network environment configured to provide content inspection in privacy enhanced cloud conferencing, according to an example embodiment.

With reference now made to FIG. 1, depicted therein is a network environment 100 configured to provide content inspection in conjunction with privacy enhanced cloud conferencing. Specifically, the techniques described herein are applied to "online collaborative sessions." As used herein, an "online collaborative session" may include a real-time communication over a data channel. Examples of online collaborative sessions include audio and/or video conferences. Other examples may include an instant messaging "chat" between two or more participants. The techniques described herein may be applied to online collaborative sessions in which security is applied to ensure the privacy of the sessions. An example infrastructure for such as session is illustrated through network environment 100.

Central to an online collaborative session are the functions performed by the conference provider. In the present example embodiment, these functions are performed by devices under the control of the conference provider, mainly conference server 105 and media distribution device (MDD) 110. As illustrated, conference server 105 provides a signaling channel 115 between conference participant devices 120a-c. Signaling channel 115 may provide control signals for the audio and/or video associated with the online collaborative session, and therefore, may operate according to a protocol such as the Session Initiation Protocol (SIP). Furthermore, signaling channel 115 may also be used to distribute media between participant devices 120a-c using, for example, Web Real-Time Communication (webRTC) applications. The media distributed via conference server 105 and signaling channel 115 may comprise audio that requires mixing, video that requires transcoding, or media specifically tailored for particular participants.

MDD 110 also provides a channel to communicate with participant devices 120a-c, specifically data channel 125. MDD 110 forwards all or a subset of data received from one of participant devices 120a-c to the other participant devices 120a-c in the online collaborative session. In other words, MDD 110 transmits the appropriate data flows to participants without having knowledge of the content of the media.

Unlike signaling channel 115, in the example embodiment of FIG. 1, data channel 125 may not carry the media (i.e., the audio or video data) associated with the online collaborative session. Instead, data channel 125 carries additional data, such as data sent as part of a file sharing operation, a chat operation, a virtual white board application, and others. In other words, data channel 125 is configured to share data between participant devices 120a-c that contains data other than the real-time audio and/or video of the online collaborative session. If the online collaborative session is limited to conversations via a chat application, MDD 110 may serve as an instant messaging relay service, with data channel 125 serving as the data channel used for file transfers initiated by the chat application.

Because MDD 110 may be under the control of a third party (i.e., a service provider or organization other than the organization to which one or more of the participants belongs), key management device 130 provides a key management function for participant device 120a-c to ensure that the data transmitted through data channel 125 is done so securely. Specifically, key management device 130 manages and provides keys to participant device 120a-c so that participant device 120a-c may send data over data channel 125 using secure protocols. For example, participant devices 120a-c may send data over data channel 125 using the Stream Control Transmission Protocol (SCTP) over Data Transport Layer Security (DTLS) over User Datagram Protocol (UDP) packets. Accordingly, SCTP header portions of the data sent via data channel 125 may be encrypted using hop-by-hop keys derived from a DTLS handshake while the SCTP payload portion may be encrypted using end-to-end keys. These end-to-end encryption keys are provided and managed by key management device 130.

According to some example embodiments, the online collaborative session may be a Privacy Enhanced Real-Time Protocol Conferencing (PERC) session. PERC sessions may use keying as described in Internet Engineering Task Force (IETF) Request for Comments No. 4568 (RFC4568). Additional information may also be found in the IETF drafts entitled "SRTP Double Encryption Procedures," "A Solution Framework for Private Media in Privacy Enhanced RTP Conferencing," and "Encrypted Key Transport for Secure RTP," all dated Jul. 8, 2016. According to such an embodiment, key management device 130 provides keying services for the PERC session.

MDD 110 may be provided with hop-by-hop keys in order to decrypt the SCTP header portion of the data sent via data channel 125. Nevertheless, MDD 110 is not considered a trusted device due to, for example, the fact it may be under the control of a third party service provider. Accordingly, MDD 110 may not be provided with the end-to-end keys used to encrypt and decrypt the packet payloads of the data sent via data channel 125. Not providing the end-to-end keys to MDD 110 is beneficial in that it maintains the security of the data transmitted via data channel and it allows MDD 110 to be embodied in a device with relatively low processing and memory resources, as MDD 110 will not be encrypting and/or decrypting the payloads of packets sent via data channel 125. On the other hand, because MDD 110 may not be capable of evaluating the content of the packet payloads, MDD 110 may not provide centralized security for data sent via data channel 125.

For example, when data channel 125 is used to provide a file transfer application in which a data file is transmitted from one of participants 120a-c to another of participants 120a-c it may be beneficial to provide a security scan, such as a virus or malware scan, on the data file prior to the file being received by the participants 120a-c. Because MDD 110 may not be provided with the end-to-end keys for the data transmitted by data channel 125, MDD 110 may not be able to provide such a function as it may be unable to decrypt the payload portion of the data packets sent via data channel 125.

In order to provide a centralized security function within network environment 100 for data sent via data channel 125, included in network environment 100 is security participant device 135. Security participant device 135 is configured as a trusted device, and therefore, is configured to join an online collaborative session using keys received from key management device 130. Accordingly, security participant device 135 will receive the data distributed between participants 120a-c via data channel 125. In other words, security participant device 135 interacts with key management device 130 in order to receive end-to-end encryption keys for data sent via data channel 125. With end-to-end keys in its possession, security participant device 135 may decrypt the payload portions of data packets sent via data channel 125, examine the payload contents, and apply security policies to the content. As illustrated in FIG. 1, security participant device 135 may not receive data from signaling channel 115, though other example embodiments may include security participant device receiving all data associated with the online collaborative session, including the real-time audio and/or video provided by signaling channel 115.

In addition to MDD 110 transmitting data packets sent over data channel 125 to security participant device 135, additional steps may be taken to ensure that security participant device 135 has sufficient opportunities to apply the security policies to the data packets received over data channel 125. For example, packets sent by participant 120b over data channel 125 may be sent to security participant device 135 a predetermined period of time prior to corresponding packets being sent to participant devices 120a and 120c. Similarly, MDD 110 may transmit a predetermined amount of data (e.g., a predetermined number of bits, bytes, kilobytes, etc.) to security participant device 135 prior to sending corresponding data to participant devices 120a-c. By giving security participant device 135 this predetermined "head start," security participant device 135 may provide centralized security for data sent via data channel 125.

Having received the data packets sent by participant 120b from MDD prior to being sent to participant devices 120a and 120c, security participant device 135 may signal MDD 110 when malicious or otherwise problematic packets are sent via data channel 125. For example, if security participant device 135 determines that a packet received via data channel 125 is malicious, security participant device 135 may signal MDD 110 that that packet should not be sent to participants 120a-c. Security participant device 135 may also signal MDD 110 that data channel 125 should be terminated so that no further data may be sent over the channel. According to such an example, the predetermined period is chosen to be sufficiently long or a sufficiently large amount of data that security participant device 135 has sufficient time to receive a packet, decrypt the payload of the packet, apply security policies to the packet, and signal the malicious nature of the packet back to MDD 110.

According to other examples, security participant device 135 may only be able to determine whether or not packets received over data channel 125 are malicious after a plurality of packets are received. For example, the packets received over data channel 125 may be sent as part of a file transfer application. Accordingly, security participant device 135 will need to receive a sufficient number of packets associated with the file being transferred to determine whether or not the file contains, for example, a virus or malware. Therefore, the predetermined duration or amount of data should be chosen to allow enough time for security participant device 135 to fully or partially construct the received file, apply security policies to the file, signal the malicious nature of the file to MDD 110, and allow MDD to abort full transmission of the file to participants 120a-c. In response to receiving the abort message, MDD 110 will cease transmitting to participant devices 120a-c any remaining packets associated with the malicious file, and send a warning or error message to participant devices 120a-c that the file transfer has been aborted.

According to some example embodiments, security participant device 135 and MDD 110 may be implemented as network service functions that communicate using packets encapsulated in a network service header (NSH). Fields within the NSH allow security participant device 135 and MDD 110 to communicate. As illustrated in greater detail below with reference to FIGS. 4 and 5, metadata fields of NSHs may be used to communicate security information between security participant device 135 and MDD 110. Furthermore, service functions within cloud environments are often implemented in the form of virtual devices or virtual machines. Accordingly, the term "device" is used broadly herein to refer to both physical and virtual devices. Furthermore, multiple devices described herein, such as MDD 110 and security participant device 135 may be virtualized devices that reside or execute within the same physical device.

The communications between MDD 110 and security participant device 135 may take place via a tunnel, such as a Secure Internet Protocol (IPSEC) tunnel. Specifically, MDD 110 may create an IPSEC tunnel with security participant device 135 over which traffic for data channel 125 is sent. Furthermore, security participant device 135 may instruct MDD 110 that it should receive packets a predetermined amount prior to participant devices 120a-c. These instructions may be included in the metadata fields of an NSH that encapsulates packets sent via the IPSEC tunnel. When security participant device 135 sends instructions to MDD 110 that packets should not be distributed to participant devices 120a-c, these instructions may be included in the metadata fields of an NSH.

Security participant device 135 may also determine that it no longer needs to participate in the online collaborative session. For example, security participant device 135 may determine that the online collaborative session does not support features that require security, that all participant devices 120a-c are located within trusted domains and/or that a sufficient number of packets have been inspected and found to be non-malicious, among others. According to one specific example, if data channel 125 is only used for a chat application, security participant device 135 may determine that it is unnecessary for MDD 110 to send the data sent over data channel 125 to security participant device 135. Upon such a determination, security participant device 135 may send instructions to MDD 110 through, for example, the metadata fields of an NSH that MDD 110 no longer needs to send security participant device 135 the data being distributed via data channel 125. According to other example embodiments, security participant device 135 may indicate that MDD 110 can concurrently distribute packets for data channel 125 to participant devices 120a-c and security participant device 135. This will allow security participant device 135 to continue to monitor the encrypted packets, but remove the latency in sending the packets to the participant network devices 120a-c.

Figure 2:
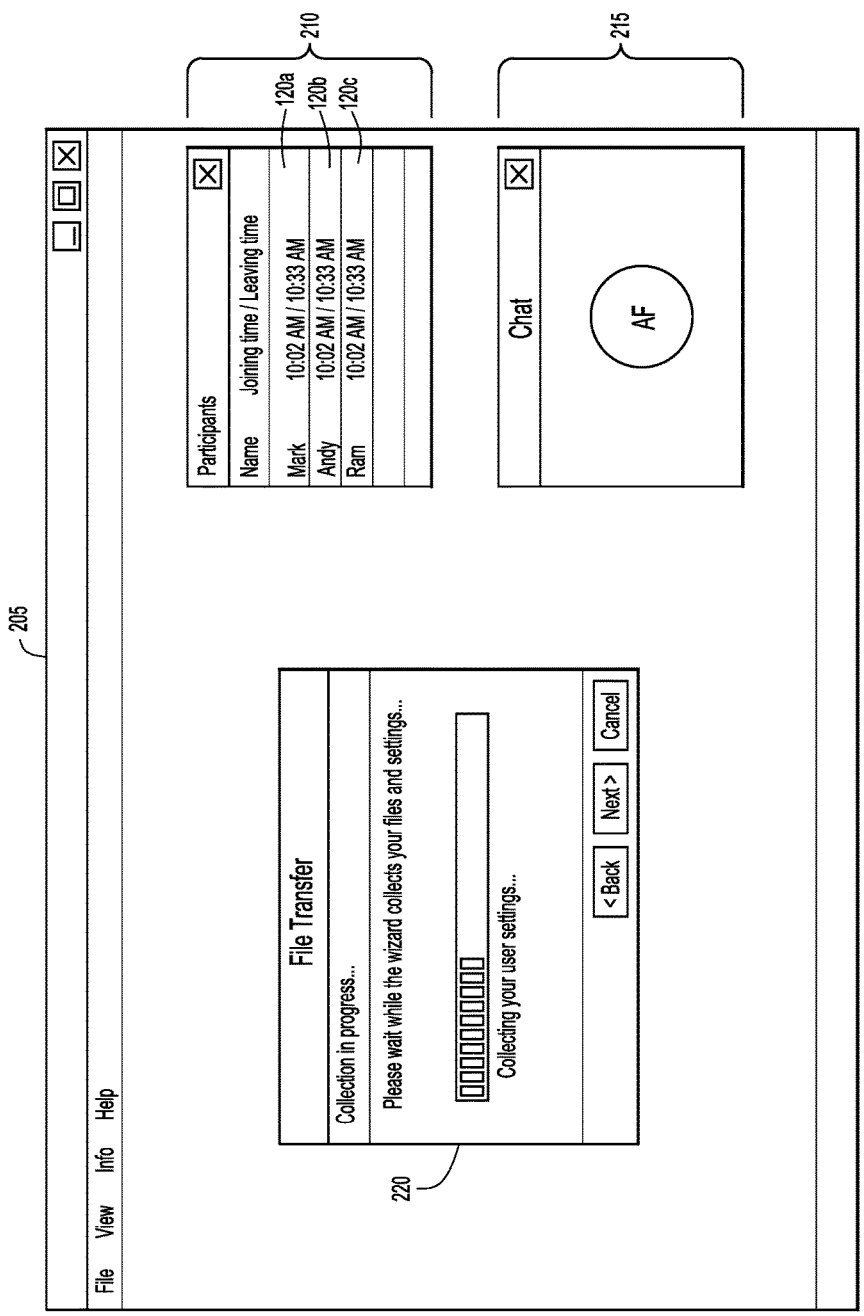
FIG. 2 is an illustration of a first example user console used in a privacy enhanced cloud conference session in which content inspection is provided, according to an example embodiment.

With reference now made to FIG. 2, depicted therein is an example online collaborative session console 205 that illustrates how a security participant device, such as security participant device 135 of FIG. 1, may be transparent to online collaborative session participants. Included in console 205 is roster portion 210 that indicates to a user that participants 120a-c are participating in the online collaborative session. The online collaborative session of FIG. 2 includes a chat application 215 and a file transfer application 220. Accordingly, a security participant device (such as security participant device 135 of FIG. 1) may be receiving data associated with chat application 215 and file transfer application 220 from an MDD (such as MDD 110 of FIG. 1) via a data channel (such as data channel 125 of FIG. 1). Nevertheless, the security participant device is not illustrated in roster portion 210, ensuring that the use of the security participant device remains transparent to the other participants 120a-c.

Figure 3:
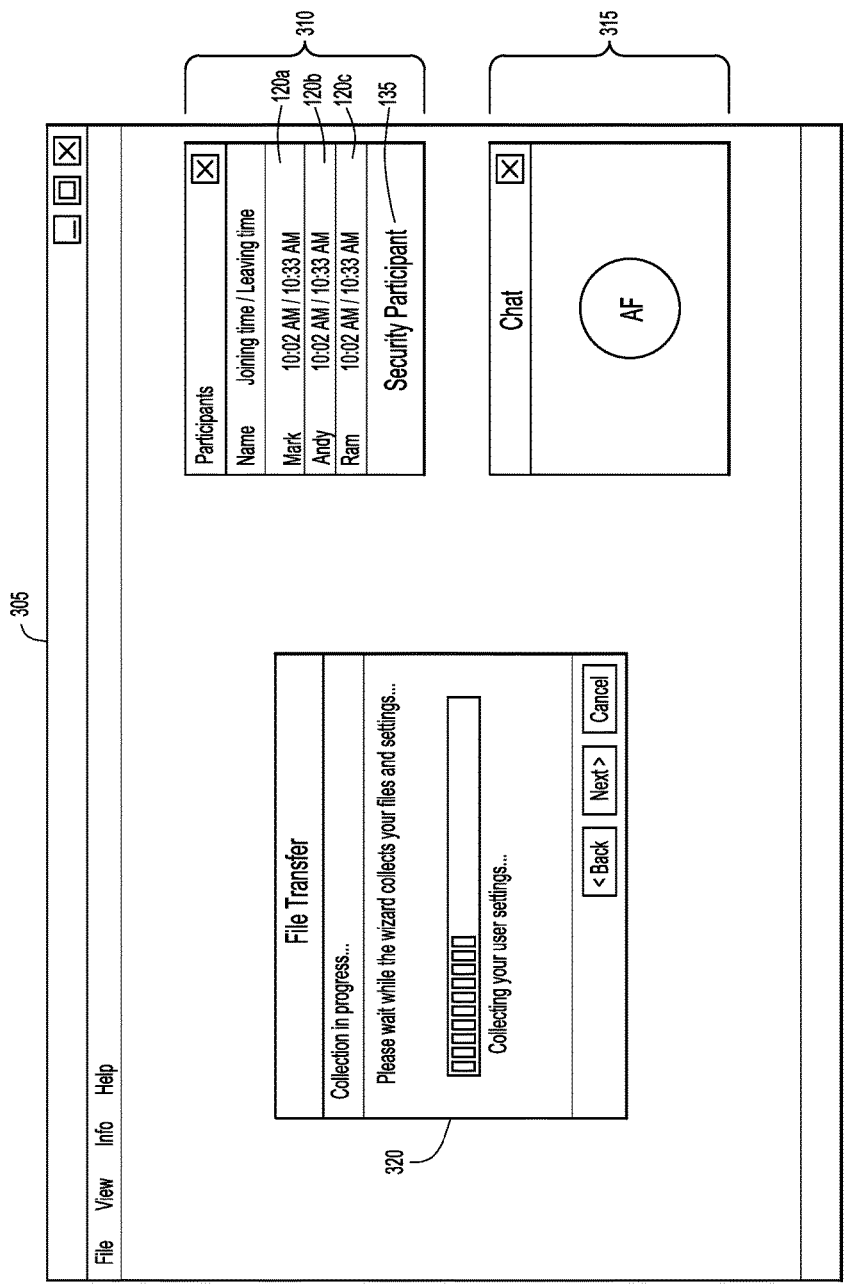
FIG. 3 is an illustration of a second example user console used in a privacy enhanced cloud conference session in which content inspection is provided, according to an example embodiment.

With reference now made to FIG. 3, depicted therein is another implementation of an online collaborative session console 305 in which security participant 135 is visible within roster portion 310. Participants 120a-c in the online collaborative session are illustrated in roster portion 310, and the online collaborative session includes a chat application 315 and a file transfer application 320. A security participant device 135 may be receiving data associated with chat application 315 and file transfer application 320 from an MDD (such as MDD 110 of FIG. 1) via a data channel (such as data channel 125 of FIG. 1). FIG. 3 differs from FIG. 2 in that security participant 135 is illustrated in roster portion 310. Security participant 135 may be included in roster portion 310 so that participants 120a-c are aware that security policies are being applied to the data associated with chat application 315 and file transfer application 320. Security participant 135 may only be included in roster portion 310 for specific users, such as an online collaborative session host or an online collaborative session system administrator.

Figure 4:
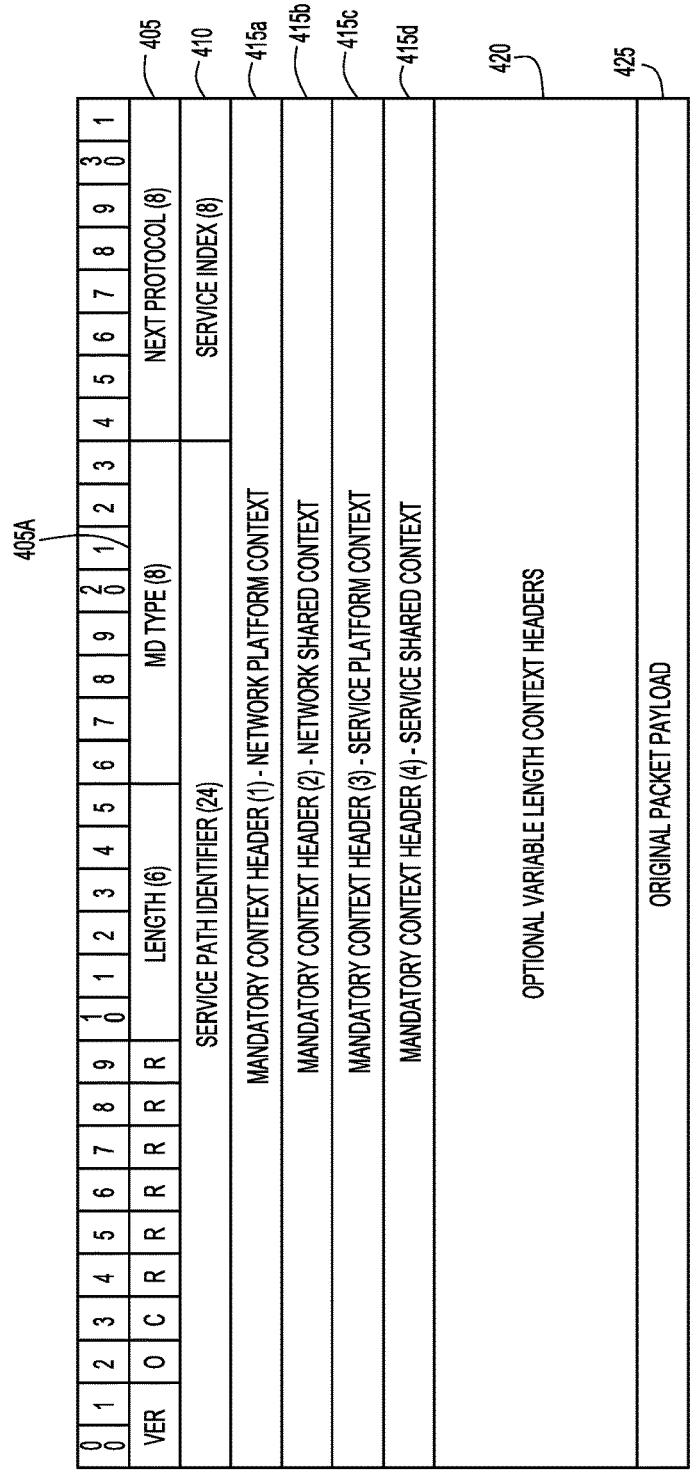
FIG. 4 is an illustration of a first example Network Service Header used to provide content inspection in privacy enhanced cloud conferencing, according to an example embodiment.
Figure 5:
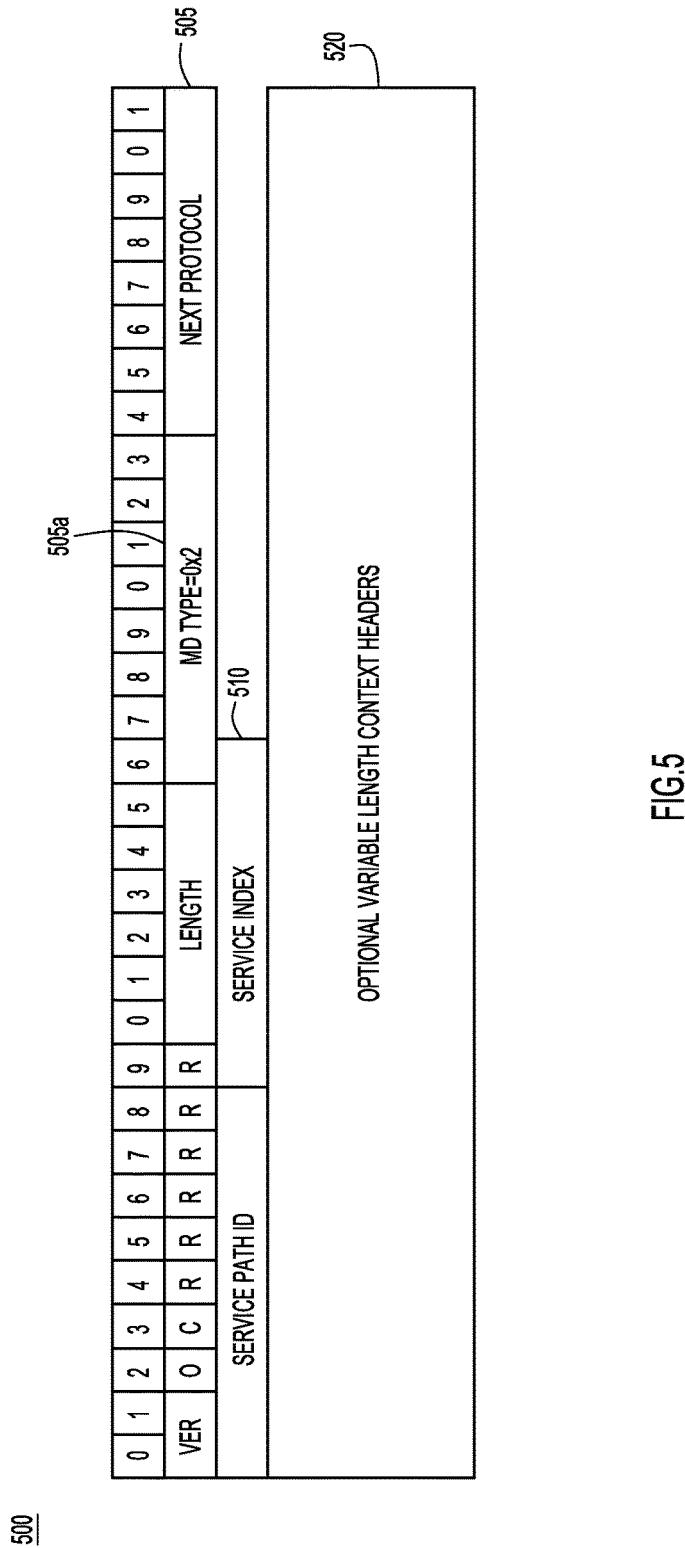
FIG. 5 is an illustration of a second example Network Service Header used to provide content inspection in privacy enhanced cloud conferencing, according to an example embodiment.

With reference now made to FIG. 4, depicted therein is an example NSH 400. NSH 400 includes a 4-byte base header 405 and a 4-byte service path header 410. The base header 405 provides information about the service header 400 and the payload 420. Included in base header 405 is a metadata type field 405a that indicates the metadata type, among a plurality of types. The metadata type field 405a in the example of FIG. 4 is what is known as Type 1 metadata. This means that the NSH includes four mandatory 4-byte context headers 415a-d. NSH 400 also includes optional variable length context headers 420. Mandatory context headers 415a-d carry opaque metadata. The optional variable length context headers 420 carry variable length type-length-value (TLV) formatted information. The service path header 410 provides information directing the packet between service functions, such as MDD 110 and security participant device 135 of FIG. 1. Finally, NSH 400 encapsulates the original packet 425.

As described above, the instructions sent between an MDD (such as MDD 110 of FIG. 1) and a security participant device (such as security participant device 135 of FIG. 1) may be included in the metadata fields of NSH 400. Accordingly, when a security participant device is instructing an MDD to send it data channel data ahead of other online collaborative session participants, these instructions may be included in one or more of context headers 415a-d and/or variable length context header field 420. Instructions directing an MDD to stop sending data to participant devices or to stop sending data to the security participant device may also be included in context headers 415*a-d* and/or variable length context header field 420.

With reference now made to FIG. 500, depicted therein is another example NSH 500. NSH 500 also includes a base header 505 and a service path header 510. Where metadata type field 405*a* of FIG. 4 indicates that NSH 400 has Type 1 metadata, metadata type field 505*a* of FIG. 5 indicates that NSH 500 includes Type 2 metadata. Accordingly, NSH 500 does not include fixed context headers, such as fixed context headers 415*a-d* of FIG. 4. Instead, NSH 500 only contains variable length context headers 520. As described above, the instructions sent between an MDD (such as MDD 110 of FIG. 1) and a security participant device (such as security participant device 135 of FIG. 1) may be included in the metadata fields of NSH 500. Accordingly, when a security participant device is instructing an MDD to send it data channel data ahead of other online collaborative session participants, these instructions may be included in variable length context header field 520. Instructions directing an MDD to stop sending data to participant devices or to stop sending data to the security participant device may also be included in variable length context header field 520.

Figure 6:
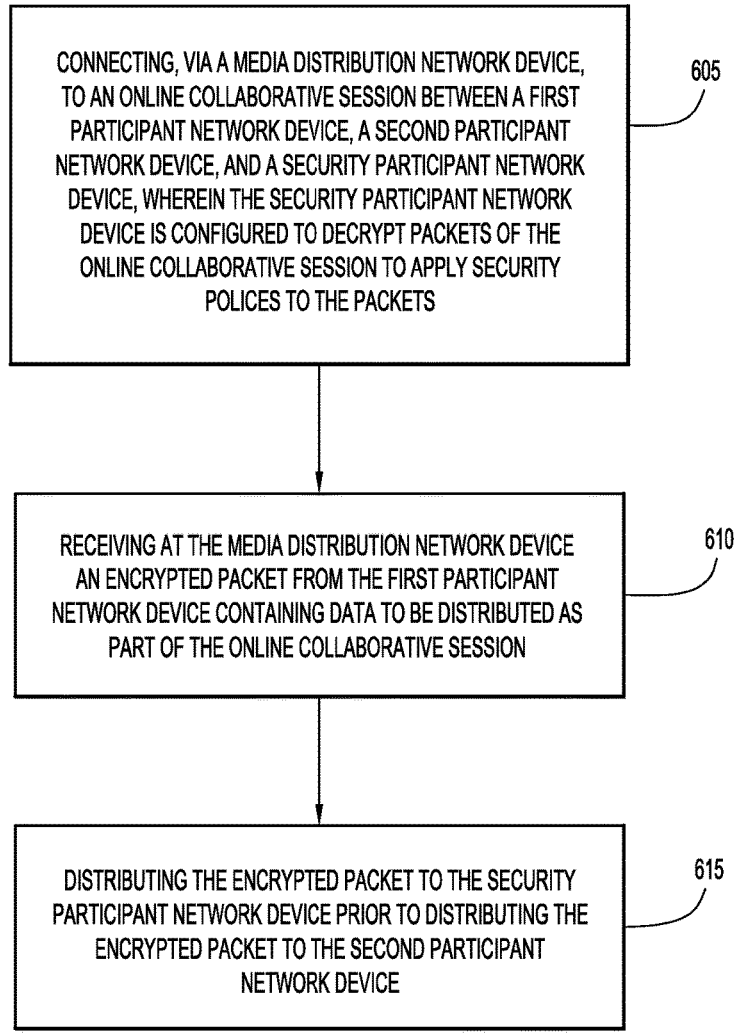
FIG. 6 is a flowchart illustrating a first example process for providing content inspection in privacy enhanced cloud conferencing, according to an example embodiment.

With reference now made to FIG. 6, depicted therein is a flowchart 600 illustrating a method for performing content inspection in privacy enhanced cloud conferencing from the "perspective" of a media distribution network device, such as MDD 110 of FIG. 1. Flowchart 600 begins in operation 605 where a media distribution network device (e.g., MDD 110 of FIG. 1) connects to an online collaborative session. The online collaborative session is between a first participant network device and second participant network device, though the online collaborative session may include more than these two participants. Also included in the online collaborative session is a security participant network device, such as security participant device 135 of FIG. 1. The security participant network device is configured to decrypt packets of the online collaborative session and apply security policies to the packets. For example, the security participant network device may have received end-to-end encryption keys from a key management device, as described above with reference to FIG. 1.

In operation 610, an encrypted packet is received at the media distribution network device from the first participant network device. The packet contains data to be distributed as part of the online collaborative session. For example, the encrypted packet may be a packet sent via data channel 125 for distribution to participant network devices 120*a-c* of FIG. 1. The data contained in the encrypted packet may be data associated with an application executing as part of the online collaborative session, such as a file transfer application, a chat application, or a white board application, among others. Some example embodiments of operation 610 may be limited to packets that do not contain the real-time audio or video associated with the online collaborative session.

In operation 615, the encrypted packet is distributed to the security participant network device prior to distributing the encrypted packet to the second participant network device. As described above with reference to FIG. 1, the encrypted packet may be sent to the security participant network device a pre-determined duration of time prior to the encrypted packet being distributed to the second participant network device. The encrypted packet may also be sent to the security participant network device a predetermined amount of data prior to the encrypted packet being distributed to the second participant network device. Once received at the security participant network device, the security participant network device may decrypt the packet, apply security polices to it, and return instructions to the media distribution network device. Once received at the media distribution network device, the media distribution network device may respond to the instructions by, for example, not distributing corresponding packets to the second participant network device, not distributing subsequent packets to the second participant network device and/or no longer distributing packets to the security participant network device. When instructions are sent that corresponding or subsequent packets are not to be distributed to the second participant device, these packets may be dropped by the media distribution network device.

Figure 7:
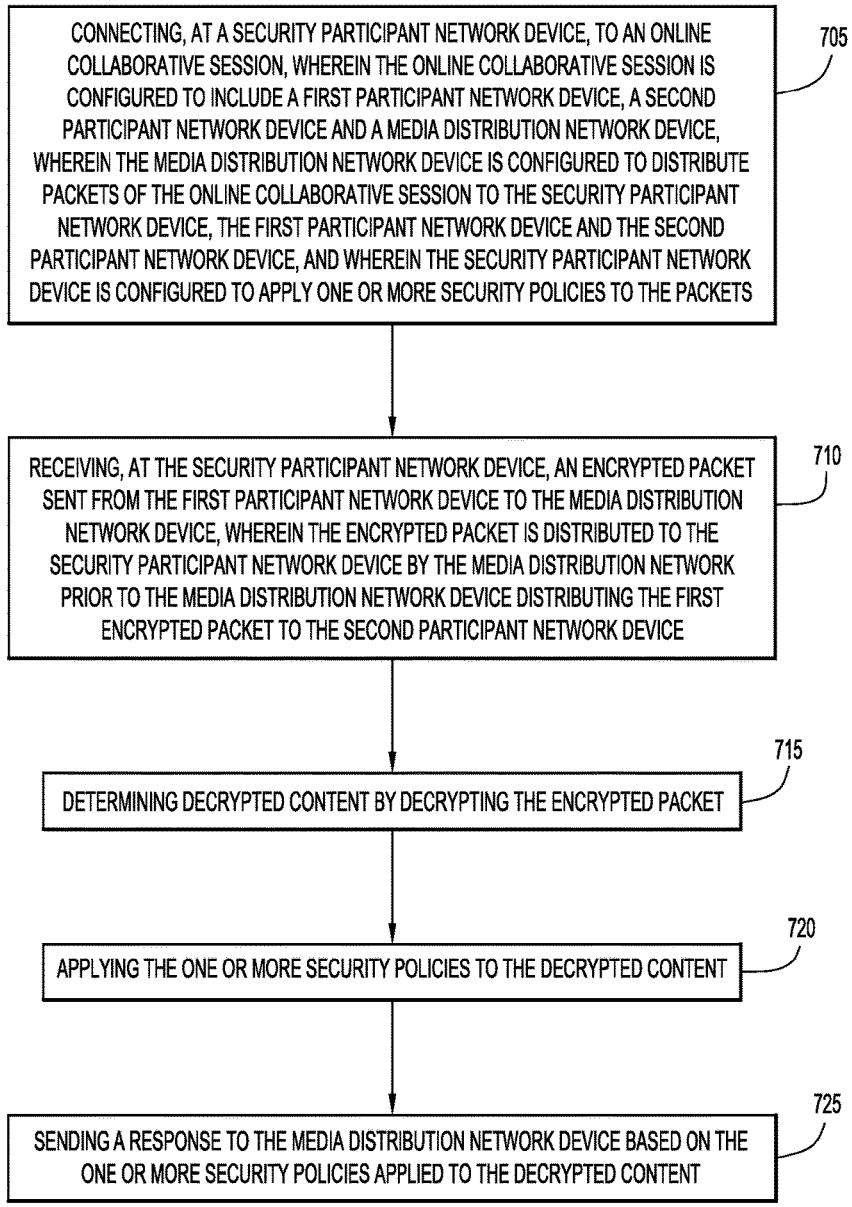
FIG. 7 is a flowchart illustrating a second example process for providing content inspection in privacy enhanced cloud conferencing, according to an example embodiment.

With reference now made to FIG. 7, depicted therein is a flowchart 700 illustrating a method for performing content inspection in privacy enhanced cloud conferencing from the "perspective" of a security participant network device, such as security participant device 135 of FIG. 1. The flowchart begins in operation 705 where a security participant network device connects to an online collaborative session. The online collaborative session is between a first participant network device and second participant network device, though the online collaborative session may include more than these two participants. Also included in the online collaborative session is a media distribution network device, such as MDD 110 of FIG. 1. The media distribution network device is configured to distribute packets of the online collaborative session to the security participant network device, the first participant network device and the second participant network device, while the security participant network device is configured to apply one or more security policies to the packets.

In operation 710, an encrypted packet is received at the security participant network device. The encrypted packet was sent from the first participant network device to the media distribution network device. The encrypted packet is received at the security participant network device from the media distribution network device, and the encrypted packet is distributed to the security participant network device prior to distribution to the second participant network device. For example, the media distribution network device may distribute the encrypted packet to the security participant network device a predetermined duration of time or a predetermined amount of data prior to the encrypted packet being distributed to the second participant network device.

In operation 715, decrypted content of the encrypted packet is determined by decrypting the encrypted packet. For example, the media distribution network device may decrypt a payload portion of the packet using an end-to-end key received from a key management device. In operation 720, one or more security policies are applied to the decrypted content. For example, the content of a decrypted payload may be analyzed for computer viruses or malware. The analysis of the decrypted content may include combining the decrypted content with content from previously or subsequently received packets in order to construct an application file that may be analyzed as a whole.

Finally, in operation 725, a response is sent to the media distribution network device based on the one or more security policies applied to the decrypted content. The instructions may include instructions telling the media distribution device to not distribute corresponding packets to the second participant network device, to not distribute subsequent packets to the second participant network device and/or to no longer distribute packets to the security participant network device. When instructions are sent that corresponding or subsequent packets are not to be distributed to the second participant device, these packets may be dropped by the media distribution network device.

According to some example embodiments, the instructions sent to the MDD may include instructions that the MDD should terminate the data channel used to distribute the malicious packets. When such instructions are received, the MDD gracefully closes the data channels to all participants and conveys to the conference participants the error message that is received in the NSH from the security participant network device. Accordingly, the security participant network device is configured to control both the actions taken by the MDD to remedy the issues raised by application of the security policies and also control the content of the messages sent to the other participant devices.

According, as illustrated though the flowcharts of FIGS. 6 and 7, described herein are mechanisms by which security functions can inspect data channels in a privacy enhanced cloud conferencing call and block transfer of infected or otherwise suspect files. These mechanisms allow enterprises to inspect data channels in a privacy enhanced cloud conferencing call and block transfer of malicious files or infected files. These techniques also allow an enterprise network to combine cloud services offered by different service providers.

Furthermore, the techniques provided for herein ensure that data from the online collaborative session is not leaked to the conferencing provider. Because the end-to-end security keys are managed by a key management device, such as key management device 130 of FIG. 1, which is under the control of the organization for which the conference is being provided, complete control and auditability of all participants including any "hidden" security function components is maintained by the organization for whom the online collaborative session is being provided, and this control is not relinquished to the conferencing provider. In other words, the techniques provided for herein allow for application of security policies to be under the control of the online collaborative session customer, not the online collaborative session service provider. Accordingly, even if the online collaborative session service provider misbehaves and injects its own service function or participant into the online collaborative session to receive encrypted packets, this service function will not be able to decrypt the packets as it will not be able to authenticate and receive end-to-end keys from the key management device.

Figure 8:
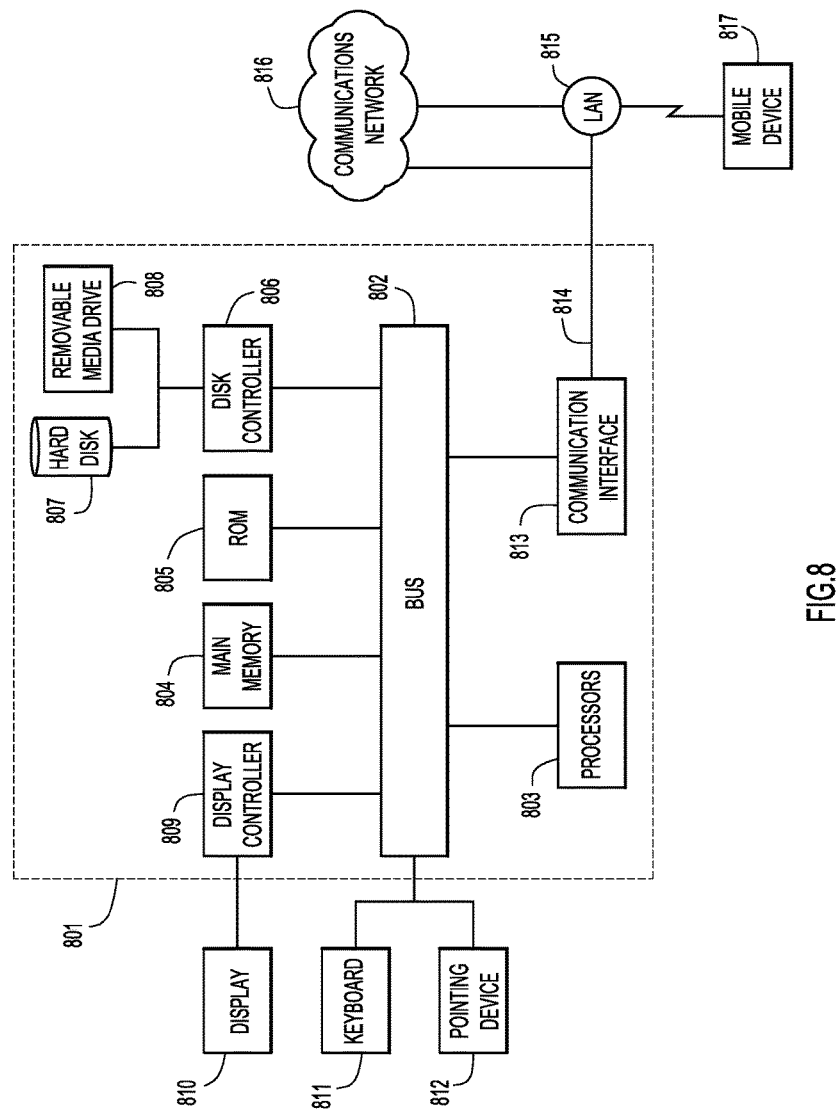
FIG. 8 is a block diagram of a device configured to provide content inspection in privacy enhanced cloud conferencing, according to an example embodiment.

With reference now made to FIG. 8, illustrated therein is a computer system 801 upon which the embodiments presented may be implemented. The computer system 801 may be programmed to implement a computer based device, such as a video conferencing endpoint or any device includes a video encoder or decoder for processing real time video images. The computer system 801 includes a bus 802 or other communication mechanism for communicating information, and a processor 803 coupled with the bus 802 for processing the information. While the figure shows a signal block 803 for a processor, it should be understood that the processors 803 represent a plurality of processing cores, each of which can perform separate processing. The computer system 801 also includes a main memory 804, such as a random access memory (RAM) or other dynamic storage device (e.g., dynamic RAM (DRAM), static RAM (SRAM), and synchronous DRAM (SD RAM)), coupled to the bus 802 for storing information and instructions to be executed by processor 803. In addition, the main memory 804 may be used for storing temporary variables or other intermediate information during the execution of instructions by the processor 803.

The computer system 801 further includes a read only memory (ROM) 805 or other static storage device (e.g., programmable ROM (PROM), erasable PROM (EPROM), and electrically erasable PROM (EEPROM)) coupled to the bus 802 for storing static information and instructions for the processor 803.

The computer system 801 also includes a disk controller 806 coupled to the bus 802 to control one or more storage devices for storing information and instructions, such as a magnetic hard disk 807, and a removable media drive 808 (e.g., floppy disk drive, read-only compact disc drive, read/write compact disc drive, compact disc jukebox, tape drive, and removable magneto-optical drive). The storage devices may be added to the computer system 801 using an appropriate device interface (e.g., small computer system interface (SCSI), integrated device electronics (IDE), enhanced-IDE (E-IDE), direct memory access (DMA), or ultra-DMA).

The computer system 801 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 801 may also include a display controller 809 coupled to the bus 802 to control a display 810, such as a cathode ray tube (CRT), for displaying information to a computer user. The computer system 801 includes input devices, such as a keyboard 811 and a pointing device 812, for interacting with a computer user and providing information to the processor 803. The pointing device 812, for example, may be a mouse, a trackball, or a pointing stick for communicating direction information and command selections to the processor 803 and for controlling cursor movement on the display 810. In addition, a printer may provide printed listings of data stored and/or generated by the computer system 801.

The computer system 801 performs a portion or all of the processing steps of the process in response to the processor 803 executing one or more sequences of one or more instructions contained in a memory, such as the main memory 804. Such instructions may be read into the main memory 804 from another computer readable medium, such as a hard disk 807 or a removable media drive 808. One or more processors in a multi-processing arrangement may also be employed to execute the sequences of instructions contained in main memory 804. In alternative embodiments, hard-wired circuitry may be used in place of or in combination with software instructions. Thus, embodiments are not limited to any specific combination of hardware circuitry and software.

As stated above, the computer system 801 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 801, for driving a device or devices for implementing the process, and for enabling the computer system 801 to interact with a human user (e.g., print production personnel). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 801 also includes a communication interface 813 coupled to the bus 802. The communication interface 813 provides a two-way data communication coupling to a network link 814 that is connected to, for example, a local area network (LAN) 815, or to another communications network 816 such as the Internet. For example, the communication interface 813 may be a wired or wireless network interface card to attach to any packet switched (wired or wireless) LAN. As another example, the communication interface 813 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 813 sends and receives electrical, electromagnetic or optical signals that carry digital data streams representing various types of information.

The network link 814 typically provides data communication through one or more networks to other data devices. For example, the network link 814 may provide a connection to another computer through a local are network 815 (e.g., a LAN) or through equipment operated by a service provider, which provides communication services through a communications network 816. The local network 814 and the communications network 816 use, for example, electrical, electromagnetic, or optical signals that carry digital data streams, and the associated physical layer (e.g., CAT 5 cable, coaxial cable, optical fiber, etc.). The signals through the various networks and the signals on the network link 814 and through the communication interface 813, which carry the digital data to and from the computer system 801 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 801 can transmit and receive data, including program code, through the network(s) 815 and 816, the network link 814 and the communication interface 813. Moreover, the network link 814 may provide a connection through a LAN 815 to a mobile device 817 such as a personal digital assistant (PDA) laptop computer, or cellular telephone.

In summary, provided for herein are methods in which a media distribution network device connects to an online collaborative session between a first participant network device, a second participant network device, and a security participant network device. The security participant network device is configured to decrypt packets of the online collaborative session to apply security polices to the packets. An encrypted packet is received at the media distribution network device. The encrypted packet is received from the first participant network device containing data to be distributed as part of the online collaborative session. The encrypted packet is distributed to the security participant network device prior to distributing the encrypted packet to the second participant network device.

Also provided for herein are method in which a security participant network device connects to an online collaborative session. The online collaborative session is configured to include a first participant network device, a second participant network device and a media distribution network device. The media distribution network device is configured to distribute packets of the online collaborative session to the security participant network device, the first participant network device and the second participant network device. The security participant network device is configured to apply one or more security policies to the packets. An encrypted packet sent from the first participant network device to the media distribution network device is received at the security participant network device. The encrypted packet was distributed to the security participant network device by the media distribution network prior to the media distribution network device distributing the first encrypted packet to the second participant network device. Decrypted content is determined by decrypting the encrypted packet. The one or more security policies are applied to the decrypted content. A response is sent to the media distribution network device based on the one or more security policies applied to the decrypted content.

In addition to the methods described above, also provided for herein is an apparatus comprising one or more processors and a network interface unit configured to enable network communications. Accordingly, the processor of the apparatus is configured to connect to an online collaborative session between a first participant network device, a second participant network device, and a security participant network device. The security participant network device is configured to decrypt packets of the online collaborative session to apply security polices to the packets. The processor is configured to receive an encrypted packet via the network interface. The encrypted packet is received from the first participant network device containing data to be distributed as part of the online collaborative session. The processor is further configured to distribute the encrypted packet, via the network interface unit, to the security participant network device prior to distributing the encrypted packet to the second participant network device.

In addition, an apparatus is provided comprising one or more processors and one or more network interface units, configured to connect to an online collaborative session. The online collaborative session is configured to include a first participant network device, a second participant network device and a media distribution network device. The media distribution network device is configured to distribute packets of the online collaborative session to the security participant network device, the first participant network device and the second participant network device. The processor is configured to apply one or more security policies to the packets. The processor is configured to receive, via the network interface, an encrypted packet sent from the first participant network device to the media distribution network device. The encrypted packet was distributed to the apparatus by the media distribution network device prior to the media distribution network device distributing the first encrypted packet to the second participant network device. The processor is configured to determine decrypted content by decrypting the encrypted packet. The processor is further configured to apply the one or more security policies to the decrypted content. The processor is also configured to send, via the network interface, a response to the media distribution network device based on the one or more security policies applied to the decrypted content.

Also provided for herein are non-transitory computer readable media encoded with instructions. When executed, the instructions cause the techniques described herein to be implemented by, for example, a processor. The instructions, when executed, cause a media distribution network device to connect to an online collaborative session between a first participant network device, a second participant network device, and a security participant network device. The security participant network device is configured to decrypt packets of the online collaborative session to apply security polices to the packets. The instructions, when executed, cause an encrypted packet to be received at the media distribution network device. The encrypted packet is received from the first participant network device containing data to be distributed as part of the online collaborative session. The instructions, when executed, further cause the encrypted packet to be distributed to the security participant network device prior to distributing the encrypted packet to the second participant network device.

Further, non-transitory computer readable media are provided encoded with instructions that, when executed, cause a security participant network device to connect to an online collaborative session. The online collaborative session is configured to include a first participant network device, a second participant network device and a media distribution network device. The media distribution network device is configured to distribute packets of the online collaborative session to the security participant network device, the first participant network device and the second participant network device. The security participant network device is configured to apply one or more security policies to the packets. The instructions, when executed, cause an encrypted packet sent from the first participant network device to the media distribution network device to be received at the security participant network device. The encrypted packet was distributed to the security participant network device by the media distribution network prior to the media distribution network device distributing the first encrypted packet to the second participant network device. The instructions, when executed, determine decrypted content by decrypting the encrypted packet. Execution of the instructions cause the one or more security policies to be applied to the decrypted content. Finally, the instructions, when executed, cause a response to be sent to the media distribution network device based on the one or more security policies applied to the decrypted content.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   connecting, via a media distribution network connected computing device, to an online collaborative session between a first participant network connected computing device, a second participant network connected computing device, and a security participant network connected computing device, wherein the security participant network connected computing device is configured to decrypt packets of the online collaborative session to apply security polices to the decrypted packets;
   receiving at the media distribution network connected computing device an encrypted packet from the first participant network connected computing device containing data to be distributed as part of the online collaborative session;
   distributing, via the media distribution network connected computing device, the encrypted packet to the security participant network connected computing device prior to distributing the encrypted packet to the second participant network connected computing device;
   receiving, at the media distribution network connected computing device from the security participant network connected computing device, an indication indicating how the encrypted packet should be processed as part of the online collaborative session; and
   processing the encrypted packet in accordance with the indication without the media distribution network connected computing device decrypting the encrypted packet.

2. The method of claim 1, wherein receiving the indication comprises receiving an indication from the security participant network connected computing device that the encrypted packet should not be distributed to the second participant network connected computing device; and
   wherein processing the encrypted packet comprises dropping the encrypted packet prior to distributing the encrypted packet to the second participant network connected computing device.

3. The method of claim 1, wherein receiving the indication comprises receiving at the media distribution network connected computing device an indication from the security participant network connected computing device that subsequently received encrypted packets should not be sent to the security participant network connected computing device prior to the second participant network connected computing device; and
   the method further comprising distributing a second encrypted packet to the second participant network connected computing device without first sending the second encrypted packet to the security participant network connected computing device.

4. The method of claim 3, wherein distributing the second encrypted packet to the second participant network connected computing device comprises concurrently distributing the second encrypted packet to the second participant network connected computing device and the security participant network connected computing device.

5. The method of claim 3, wherein distributing the second encrypted packet to the second participant network connected computing device comprises distributing the second encrypted packet to the second participant network connected computing device without distributing the second encrypted packet to the security participant network connected computing device.

6. The method of claim 1, further comprising distributing the encrypted packet to the second participant network connected computing device after a predetermined duration of time from distributing the encrypted packet to the security participant network connected computing device.

7. The method of claim 1, further comprising distributing the encrypted packet to the second participant network connected computing device after a predetermined number of bits of data are received at the media distribution network connected computing device from the first participant network connected computing device subsequent to distributing the encrypted packet to the security participant network connected computing device.

8. The method of claim 1, wherein:
connecting to the online collaborative session comprises establishing a plurality of data channels between the first participant network connected computing device, the second participant network connected computing device and the security participant network connected computing device;
the plurality of data channels comprises a first data channel configured to distribute packets comprising at least one of audio data or video data associated with the online collaborative session, and a second data channel configured to distribute application files; and
the encrypted packet is received via the second data channel.

9. A method comprising:
connecting, at a security participant network connected computing device, to an online collaborative session, wherein the online collaborative session is configured to include a first participant network connected computing device, a second participant network connected computing device and a media distribution network connected computing device, wherein the media distribution network connected computing device is configured to distribute encrypted packets of the online collaborative session to the security participant network connected computing device, the first participant network connected computing device and the second participant network connected computing device, wherein the media distribution network connected computing device is not configured to decrypt the encrypted packets, and wherein the security participant network connected computing device is configured to apply one or more security policies to the packets;
receiving, at the security participant network connected computing device, an encrypted packet sent from the first participant network connected computing device to the media distribution network connected computing device, wherein the encrypted packet is distributed to the security participant network connected computing device by the media distribution network connected computing device prior to the media distribution network connected computing device distributing the first encrypted packet to the second participant network connected computing device;
determining decrypted content by decrypting the encrypted packet;
applying the one or more security policies to the decrypted content; and
sending, to the media distribution network connected computing device based on the one or more security policies applied to the decrypted content, an indication indicating how the encrypted packet should be processed as part of the online collaborative session.

10. The method of claim 9, wherein sending the indication to the media distribution network connected computing device comprises sending an indication to the media distribution network connected computing device that the encrypted packet should not be distributed to the second participant network connected computing device.

11. The method of claim 9, wherein sending the indication to the media distribution network connected computing device comprises sending an indication to the media distribution network connected computing device that the encrypted packets of the online collaborative session should not be distributed to the security participant network connected computing device prior to the second participant network connected computing device.

12. The method of claim 9, further comprising receiving encryption keys to decrypt the encrypted packets; and
wherein determining the decrypted content by decrypting the encrypted packet comprises decrypting the encrypted packet using the encryption keys.

13. The method of claim 9, wherein the encryption keys are received from a key management network service function.

14. The method of claim 9, wherein the security participant network connected computing device comprises a service function that is part of a service function chain.

15. The method of claim 9, wherein:
connecting to the online collaborative session comprises establishing a plurality of data channels between the first participant network connected computing device, the second participant network connected computing device and the security participant network connected computing device via the media distribution network connected computing device;
the plurality of data channels comprises a first data channel configured to distribute packets comprising at least one of audio data or video data associated with the online collaborative session, and a second data channel configured to distribute application files; and
the encrypted packet is received via the second data channel.

16. The method of claim 9, wherein sending the indication to the media distribution network connected computing device comprises sending an indication to the media distribution network connected computing device to terminate a data channel used to distribute the encrypted packet to the second participant network connected computing device.

17. The method of claim 9, wherein connecting, at the security participant network connected computing device, to the online collaborative session comprises connecting to the online collaborative session such that the security participant network connected computing device does not appear as a participant in the online collaborative session to the first participant network connected computing device and the second participant network connected computing device.

18. An apparatus comprising:
a network interface configured to enable network communications; and
a processor, wherein the processor is configured to:
connect, via the network interface, to an online collaborative session between a first participant network connected computing device, a second participant network connected computing device, and a security participant network connected computing device, wherein the security participant network connected computing device is configured to decrypt packets of the online collaborative session to apply security polices to the decrypted packets;

receive, via the network interface, an encrypted packet from the first participant network connected computing device containing data to be distributed as part of the online collaborative session;

distribute, via the network interface, the encrypted packet to the security participant network connected computing device prior to distributing the encrypted packet to the second participant network connected computing device;

receive, via the network interface from the security participant network connected computing device, an indication indicating how the encrypted packet should be processed as part of the online collaborative session; and process the encrypted packet in accordance with the indication without the apparatus decrypting the encrypted packet.

19. The apparatus of claim 18, wherein the processor is further configured to:

receive the indication by receiving, an indication from the security participant network connected computing device that the encrypted packet should not be distributed to the second participant network connected computing device; and drop the encrypted packet prior to distributing the packet to the second participant network connected computing device.

20. The apparatus of claim 18, wherein the processor is further configured to:

receive the indication by receiving an indication from the security participant network connected computing device that subsequently received encrypted packets should not be sent to the security participant network connected computing device; and distribute, via the network interface, a second encrypted packet to the second participant network connected computing device without first sending the second encrypted packet to the security participant network connected computing device.

* * * * *